United States Patent

Yamato

[11] 3,991,664
[45] Nov. 16, 1976

[54] COFFEEPOT

[75] Inventor: Hajime Yamato, Port Washington, N.Y.

[73] Assignee: Matsushita Electric Industrial Company, Ltd., Osaka, Japan

[22] Filed: Oct. 31, 1973

[21] Appl. No.: 411,361

[30] Foreign Application Priority Data
Feb. 13, 1973   Japan.............................. 48-18079

[52] U.S. Cl...................................... 99/310; 99/314
[51] Int. Cl.²......................................... A47J 31/04
[58] Field of Search ............. 99/310, 313, 314, 315

[56] References Cited
UNITED STATES PATENTS

| | | | |
|---|---|---|---|
| 961,096 | 6/1910 | Biggins | 99/310 |
| 1,095,973 | 5/1914 | Wojidkow | 99/310 |
| 1,291,315 | 1/1919 | West | 99/310 |
| 2,628,553 | 2/1953 | Titus | 99/310 |
| 3,682,089 | 8/1972 | Ungar et al. | 99/310 |

*Primary Examiner*—Edward L. Roberts
*Assistant Examiner*—Donald B. Massenberg
*Attorney, Agent, or Firm*—Stevens, Davis, Miller & Mosher

[57] ABSTRACT

This invention relates to a percolator-type coffeepot wherein at the upper end of a tube constituting a basket set is detachably fitted a guide made of a material having a low thermal conductivity and provided with outwardly extending guide grooves for sprinkling the boiling water gushing out through the tube over as large an area as possible in the basket of the coffeepot.

2 Claims, 3 Drawing Figures

COFFEEPOT

This invention relates to a percolator-type coffeepot.

In the conventional percolator-type coffeepots, the boiling water is forced to hit the cover of the coffeepot to sprinkle into a basket, and in case a satisfactory result is not obtained by the use of this method, the boiling water is scattered dropwise over as large an area as possible utilizing a perforated basket lid. However, in this type of coffeepot, there is entailed a hazard that the people near the coffeepot will possibly suffer a burn if the cover is opened accidentally during the boiling of water, resulting in a strong upward gush of boiling water.

The present invention eliminates, using a simple construction, the above-described drawback of the prior art.

A principal object of the present invention is to provide a guide for sprinkling boiling water laterally at the upper end of a tube constituting a basket set and to increase the safety of the basket set.

Another object of the present invention is to provide a tasty coffee by accomplishing a satisfactory brewing of coffee beans, which results from a favorable sprinkling of the boiling water.

A further object of the present invention is to produce the guide with a material having a low thermal conductivity for easy removal of the basket from the coffeepot and to prevent burning of the users.

A still further object of the present invention is to prevent, when the basket lid is lost, the overflowing of ground coffee beans into the brewed coffee.

In accordance with the present invention, the safety of the coffeepot is greatly increased as the guide for sprinkling boiling water laterally is, by the use of a simple construction, arranged at the upper end of the tube. Moreover, a tasty coffee can be provided since the boiling water is sprinkled in a very favorable manner, which leads to a satisfactory brewing of coffee.

Further, if the guide is produced with a material having a low thermal conductivity, the basket set can be readily taken out of the coffeepot without danger of burning the user, which naturally increases the ease in using the coffeepot. Furthermore, even if the user forgets to place the basket lid in position, the coffee beans will not overflow into the coffee. The present invention has such and many other advantages and outstanding features.

These objects and features of the present invention will become more clear by the following description of the preferred embodiment taking reference with the attached drawings, in which.

Figure 1:
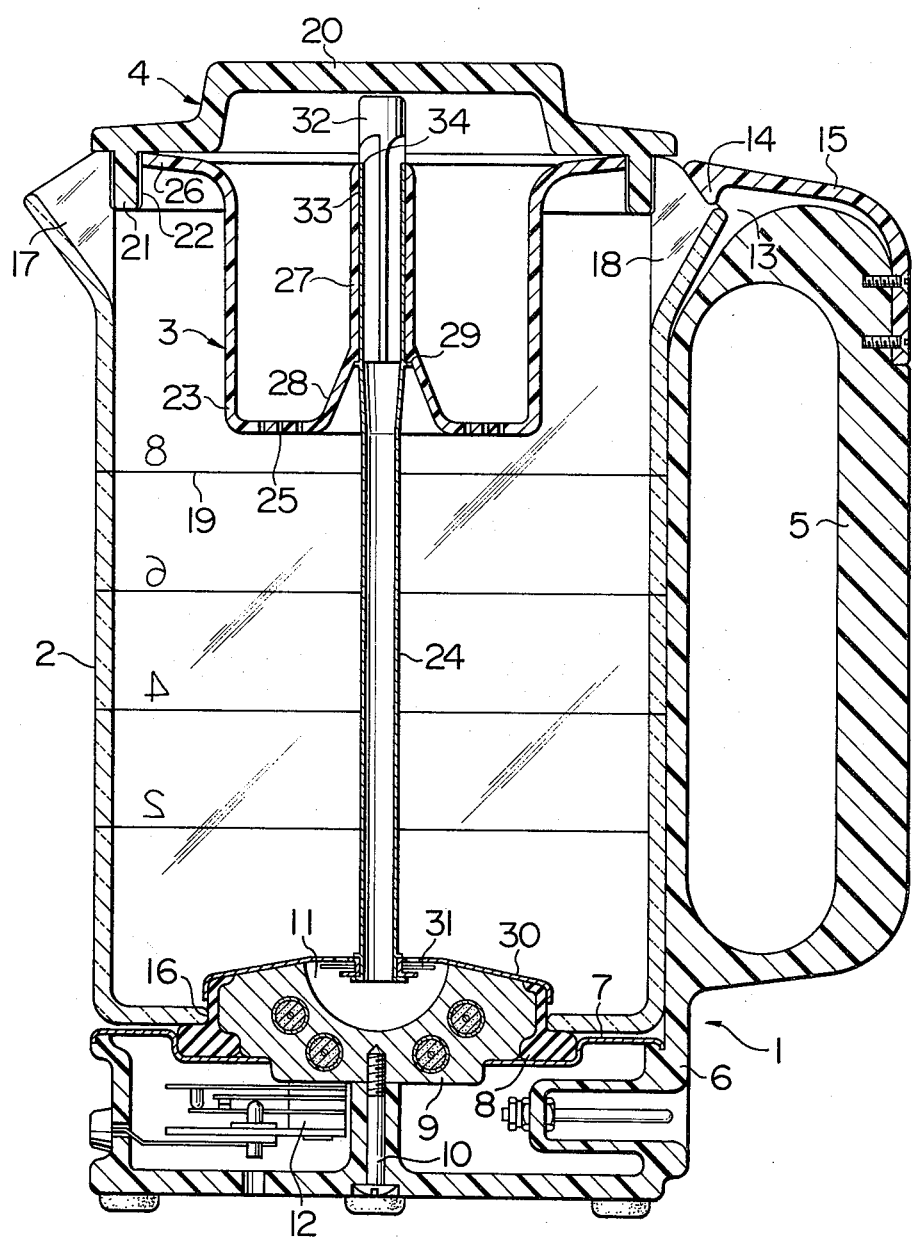
FIG. 1 is a longitudinal sectional view of the coffeepot of an embodiment of the present invention.
Figure 2:
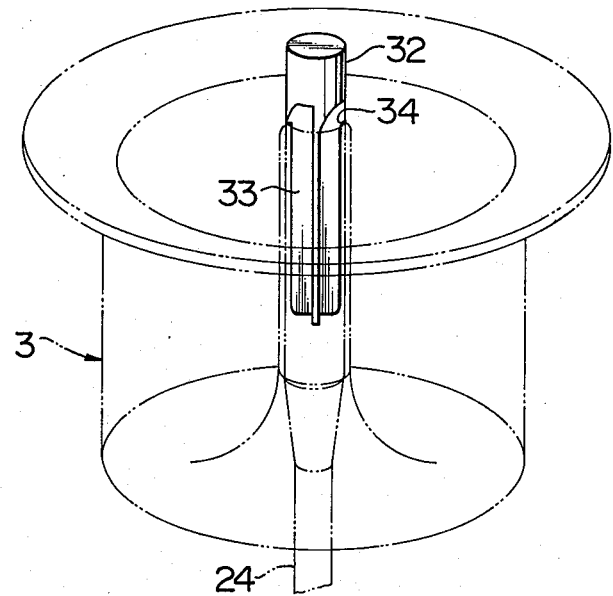
FIG. 2 is a perspective view of a guide of a basket set constituting the important part of said coffeepot.

Referring to the drawings, the percolator-type coffeepot according to the present invention comprises a heating base 1, a container 2 mounted on the heating base 1, a basket set 3 provided within the container 2, and a cover 4. On the heating base 1 is mounted a plastic outer shell 6 having a handle 5, on the opening of which is arranged a plate 7. A heater 9 is provided on the plate 7 with a packing 8 disposed therebetween. A screw 10 at the underside of the outer shell 6 extends therethrough to clamp the heater 9 in a pulling relation. On the upper surface of the heater 9 is arranged a recess 11 forming a pump chamber to be described in detail later, and a thermostat 12 is fixed to the lower side of the heater 9. The handle 5 has the uppermost part thereof a recessed portion 13 containing a hook 15 having a hooking portion 14 made of a resilient plastic.

The container 2 is made of glass and the lower surface thereof has a circular hole 16 conforming with the shape of the packing 8 of the heating base 1 to be in sealing engagement with said packing 8. On the upper edge of the container 2 are formed in opposite positions outwardly projecting ports 17 and 18. The port 17 acts as a pouring port while the port 18 is pushed into the recessed portion 13 against the resilience of the hook 15 of the handle 5 and maintained between the hook 15 and the heater 9. There are graduations 19 on the outer surface of the container 2 to indicate the amount of water in the container 2.

The cover 4 has at the upper surface thereof a knob 20 for removing the same from the coffeepot and also has at the lower part thereof a skirt 21 acting as a guide for engagement with the container 2. Ribs 22 are arranged on the inside and outside of the skirt 21. The basket set 3 comprises a basket 23 and a tube 24. The basket 23 is provided at the bottom thereof with filter holes 25 and at the upper edge thereof with a flange 26 extending to the ribs 22 of the skirt 21. Thanks to the ribs 22 there is formed a small amount of space between the cover 4 and the basket 23. In the central part of the basket 23 is disposed a guiding cylindrical portion 27 into which the tube 24 is inserted and the lower part of which has a guiding tapered recess portion 28 in the shape of an inverted funnel for easy insertion of the tube 24. A stepped portion 29 is arranged at the connection of the guiding cylindrical portion 27 and the inverted funnel portion 28. With this construction, the basket 23 is mounted on the tube 24. The upper part of the tube 24 has a diameter larger than those of the other parts of said tube. At the lower part of the tube 24 is provided a bed 30 of a large diameter which is mounted on the heater 9 and in the bed 30 is disposed a valve 31. A pump chamber is formed by the bed 30 and the recess 11 of the heater 9.

At the end of the tube 24 is detachably fitted a pillar-shaped guide 32 made of a material having a low thermal conductivity such as plastic. The guide 32 has a plurality of guiding grooves 33 extending outwardly and blocked at the upper end thereof. Guide 32 is formed with a stepped portion 34 which functions as a fitting stopper. To vary the sprinkling effect of the guide 32 according to the kind of coffeepot used, it is only necessary to change the shape, i.e., the length, inclination, and other factors of the outwardly extending guiding grooves (see FIG. 3).

In the construction described above, when the water in the pump chamber is boiled the valve 31 is closed due to the force of boiling water and the boiling water gushes out into the tube 24. As soon as the gushing-out of boiling water terminates, the valve 31 is opened to introduce the water into the pump chamber. The introduced water is again heated to boiling, resulting in the gushing-out of boiling water into the tube 24. This action is repeated many times. On the other hand, the boiling water gushed out from the pump chamber passes to the guide 32 and is sprinkled along the outwardly extending guiding grooves 33 of the guide 32. The boiling water thus sprinkled falls dropwise uniformly on the whole of the ground coffee beans in the basket 23 in a very suitable manner, and as a result, the ground coffee beans are brewed efficiently in their entirety.

Figure 3:
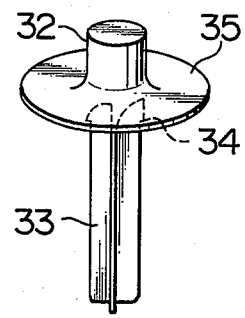
FIG. 3 is a perspective view illustrating another embodiment of the guide.

FIG. 3 shows another embodiment of the guide 32 wherein a flange 35 is provided above the stepped portion 34 to further ensure that an upward gushing-out of boiling water is prevented.

I claim:
1. A coffeepot comprising:
   a container for receiving water having a detachable cover;
   a tube extending vertically within said container;
   a valve located within said container at the lower end of said tube;
   a basket for receiving ground coffee removably mounted on and supported by said tube, said basket having a tapered recess portion therein for insertion of the upper end of said tube; and
   a pillar-shaped plastic guide closely fitted into the upper end of said tube, said guide having its outer surface in contact with the internal surface of said tube so as to be fixedly supported by the upper end of said tube, and being provided with a finite number of longitudinally extending grooves extending from the upper end of said tube and above said basket, each groove being curved upwardly and outwardly adjacent the upper end of said guide, whereby water boiled out from said tube is widely sprinkled throughout the basket area containing said ground coffee.
2. A coffeepot as set forth in claim 1 wherein the diameter of the part of said tube where said guide is fitted is larger than the diameters of other parts of said tube.

* * * * *